US012633718B2

(12) United States Patent
    Killi et al.

(10) Patent No.: US 12,633,718 B2
(45) Date of Patent: May 19, 2026

(54) LASER SYSTEM COMPRISING AN OPTICAL FIBER UNIT, AND METHOD FOR ASSESSING AN INPUT COUPLING QUALITY OF THE INPUT COUPLING OF USEFUL LIGHT INTO AN OPTICAL FIBER UNIT

(71) Applicant: TRUMPF Laser GmbH, Schramberg (DE)

(72) Inventors: Alexander Killi, Trossingen (DE); Aleksander Budnicki, Waldkirch (DE); Stefan Baumbach, Oberwolfach (DE)

(73) Assignee: TRUMPF LASER GMBH, Schramberg (DE)

( * ) Notice: Subject to any disclaimer, the term of this patent is extended or adjusted under 35 U.S.C. 154(b) by 573 days.

(21) Appl. No.: 18/295,854

(22) Filed: Apr. 5, 2023

(65) Prior Publication Data

US 2023/0261431 A1    Aug. 17, 2023

Related U.S. Application Data

(63) Continuation of application No. PCT/EP2021/075641, filed on Sep. 17, 2021.

(30) Foreign Application Priority Data

Oct. 9, 2020    (DE) ..................... 10 2020 212 818.9

(51) Int. Cl.
    *H01S 3/13*        (2006.01)
    *H01S 3/10*        (2006.01)
(52) U.S. Cl.
    CPC ........ *H01S 3/1305* (2013.01); *H01S 3/10023* (2013.01)

(58) Field of Classification Search
    CPC .... H01S 3/06708; H01S 3/0014; H01S 3/005; H01S 3/10023; H01S 3/1305
    See application file for complete search history.

(56) References Cited

U.S. PATENT DOCUMENTS

| | | | |
|---|---|---|---|
| 4,676,584 A | 6/1987 | Perlin | |
| 4,978,190 A | 12/1990 | Veith | |
| 5,216,729 A | 6/1993 | Berger et al. | |
| (Continued) | | | |

FOREIGN PATENT DOCUMENTS

| | | | |
|---|---|---|---|
| CN | 110325319 A | 10/2019 | |
| CN | 111670345 A | 9/2020 | |
| (Continued) | | | |

*Primary Examiner* — Laura A Gudorf
(74) *Attorney, Agent, or Firm* — LEYDIG, VOIT & MAYER, LTD.

(57)                ABSTRACT

A laser system includes a laser radiation source for emitting light, and an optical fiber unit that includes an optical fiber. The optical fiber includes a light guiding region, an input coupling end having a first fiber end surface for coupling the light into the light guiding region, and an output coupling end having a second fiber end surface for coupling the light out of the light guiding region. The laser system further includes a coupling device for coupling the light into the optical fiber unit, a reflection element configured to reflect the light coupled out of the light guiding region back toward the second fiber end surface to be coupled back into the light guiding region via the second fiber end surface, and a measuring device configured to capture the light reflected by the reflection element.

13 Claims, 1 Drawing Sheet

(56)                    References Cited

U.S. PATENT DOCUMENTS

| | | |
|---|---|---|
| 2011/0305249 A1 | 12/2011 | Gapontsev et al. |
| 2018/0180803 A1 | 6/2018 | Victor et al. |
| 2018/0188544 A1 | 7/2018 | Gross et al. |
| 2018/0309262 A1 | 10/2018 | Machida et al. |
| 2019/0039172 A1 | 2/2019 | Grapov |
| 2019/0214783 A1 | 7/2019 | Zhou et al. |
| 2020/0122276 A1 | 4/2020 | Blázquez-Sáchez et al. |
| 2020/0249120 A1 | 8/2020 | Miyata et al. |
| 2021/0003445 A1 | 1/2021 | Blázquez-Sáchez et al. |

FOREIGN PATENT DOCUMENTS

| | | | |
|---|---|---|---|
| DE | 3423133 | A1 | 4/1985 |
| DE | 102018205800 | A1 | 10/2018 |
| DE | 102018114368 | A1 | 12/2018 |
| JP | H0530812 | U | 4/1993 |
| JP | 2011155194 | A | 8/2011 |
| WO | WO 2006051447 | A1 | 5/2006 |

LASER SYSTEM COMPRISING AN OPTICAL FIBER UNIT, AND METHOD FOR ASSESSING AN INPUT COUPLING QUALITY OF THE INPUT COUPLING OF USEFUL LIGHT INTO AN OPTICAL FIBER UNIT

CROSS REFERENCE TO RELATED APPLICATIONS

This application is a continuation of International Application No. PCT/EP2021/075641 (WO 2022/073746 A1), filed on Sep. 17, 2021, and claims benefit to German Patent Application No. DE 10 2020 212 818.9, filed on Oct. 9, 2020. The aforementioned applications are hereby incorporated by reference herein.

FIELD

Embodiments of the present invention relate to a laser system comprising an optical fiber unit, and to a method for assessing an input coupling quality of the input coupling of useful light into an optical fiber unit.

BACKGROUND

A laser system of the type discussed here includes an optical fiber unit comprising an optical fiber having a light guiding region configured for guiding useful light through the optical fiber and, at a fiber end designated as input coupling end, a first fiber end surface for coupling laser light into the light guiding region. At a fiber end designated as output coupling end, the optical fiber unit includes a second fiber end surface for coupling laser light out of the light guiding region.

In the case of such an optical fiber unit, there is the requirement, in principle, to couple laser light into the optical fiber unit via the input coupling end with the highest possible beam quality and the lowest possible losses. In this case, it proves to be difficult for an input coupling quality of the input coupling to be suitably assessed and in particular monitored. It has been proposed to monitor the input coupling quality by capturing leakage light emerging laterally from the optical fiber unit. A power plateau typically forms in that case, however, with the result that a high power is still measured at the detector even when beam quality is poor. This prevents an optimum alignment of the input coupling. It has also been proposed, in the case of optical fiber units comprising a fiber cladding, to capture cladding light propagating in the fiber cladding. This, too, does not allow optimum assessment of the input coupling quality, however, and moreover is only appropriate if the laser light coupled into the optical fiber unit has higher modes that propagate in the fiber cladding.

SUMMARY

Embodiments of the present invention provide a laser system that includes a laser radiation source for emitting light, and an optical fiber unit that includes an optical fiber. The optical fiber includes a light guiding region configured for guiding the light through the optical fiber, an input coupling end having a first fiber end surface for coupling the light into the light guiding region, and an output coupling end having a second fiber end surface for coupling the light out of the light guiding region. The laser system further includes a coupling device for coupling the light emitted by the laser radiation source into the optical fiber unit, a reflection element that is arranged downstream of the second fiber end surface in a direction of propagation of the light and is configured to reflect the light coupled out of the light guiding region back toward the second fiber end surface to be coupled back into the light guiding region via the second fiber end surface, and a measuring device that is arranged upstream of the first fiber end surface in the direction of propagation and is configured to capture the light reflected by the reflection element.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
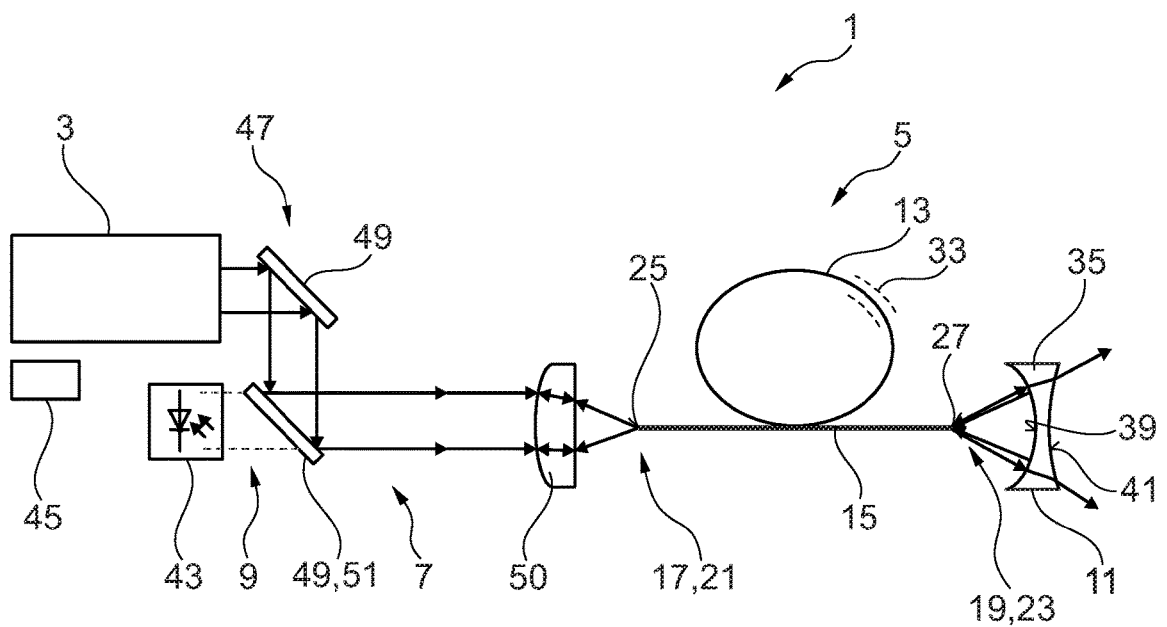
FIG. 1 shows a schematic illustration of a first exemplary embodiment of a laser system with one exemplary embodiment of an optical fiber unit.

Embodiments of the present invention provide a laser system that includes a laser radiation source for emitting useful light. The laser system also includes an optical fiber unit that has an optical fiber. The optical fiber includes a light guiding region configured for guiding useful light through the optical fiber, at an input coupling end as one fiber end, a first fiber end surface for coupling laser light into the light guiding region and, at an output coupling end as another fiber end, a second fiber end surface for coupling laser light out of the light guiding region. The laser system furthermore includes a coupling device that is configured to couple the useful light into the optical fiber unit. The laser system includes a reflection element that is arranged downstream of the second fiber end surface in the direction of propagation of the useful light and is configured to deflect a reflection of the useful light from the direction of propagation and to couple it, counter to the direction of propagation, back into the light guiding region via the second fiber end surface. The laser system furthermore includes a measuring device that is arranged upstream of the first fiber end surface in the direction of propagation and that is configured to capture the reflection of the useful light as deflected by the reflection element.

The measuring device is preferably configured to assess an input coupling quality of the input coupling of the useful light into the optical fiber unit on the basis of the captured reflection of the useful light.

The reflection element is in particular arranged downstream of the output coupling end. Alternatively or additionally, the measuring device is preferably arranged upstream of the input coupling end. The reflection element and the measuring device are in particular not themselves part of the optical fiber unit, but rather are provided in addition to the optical fiber unit in the laser system and preferably arranged separately therefrom.

In the laser system proposed here, downstream of the fiber output of the optical fiber, a reflection is thus generated and is coupled into the optical fiber again, returns in the latter counter to the direction of propagation and is finally able to be measured as a back-reflection spatially in the direction of propagation upstream of the fiber input coupling. Said back-reflection may then advantageously be used to align the input coupling in respect of power. In this case, it is advantageous that no power plateau forms during the power measurement of the light coupled back. The input coupling quality may thus be determined reproducibly and with very high accuracy. The measurement is in particular also sensitive to a deteriorated beam quality.

This capture of the back-reflection advantageously enables, in particular, with a purely passive collimation module, the implementation of an alignment mode for optimizing the input coupling state, mode monitoring of the expected output-coupled laser mode indirectly by way of the back-reflection, and laser power regulation by measurement of the back-reflection.

A fiber end surface is understood here to mean in particular an imaginary or physical surface that delimits the optical fiber in the direction of its longest extent, that is to say its longitudinal direction, which coincides in particular with the direction of propagation of the useful light propagating in the optical fiber. The fiber end surface may also be a partial surface of an end surface arrangement composed of a plurality of end surfaces. In one preferred configuration, the fiber end surface is a fiber end facet.

The direction of propagation is in particular a direction along which the laser light propagates proceeding from the laser radiation source. The indication "in the direction of propagation upstream of" an element denotes a location which photons of the useful light propagating in the direction of propagation pass through at a time before the element to which the indication relates. Accordingly, the indication "in the direction of propagation downstream of" an element denotes a location which photons propagating in the direction of propagation pass through at a time after the referenced element.

Useful light is understood here to mean in particular light which propagates as intended on a predetermined beam path leading from a laser radiation source through the light guiding region as far as a light target location. In this case, the light target location is in particular a location at which the useful light is applied as intended, for example on or at a workpiece which is irradiated, for example welded or cut, with laser light. In particular, useful light is such light which propagates as intended along the direction of propagation through the light guiding region. In particular, useful light is the sum of all photons or light rays which would pass through the light guiding region in the event of undisturbed propagation, irrespective of whether-in the direction of propagation-they are still arranged upstream of the light guiding region, in the light guiding region or downstream of the light guiding region and/or are branched off. For the qualification of light as a portion of the useful light, it is accordingly irrelevant whether the light has actually already passed through the light guiding region; rather, it is sufficient that the light would pass through the light guiding region as intended if it were not deflected beforehand by an element possibly provided for this purpose. In particular, a portion of the useful light may be deflected in the direction of propagation upstream of the light guiding region or else downstream of the light guiding region. In particular, useful light is such light which, in the case where the optical fiber unit is used in a laser processing machine, propagates in particular proceeding from the laser radiation source of the laser processing machine along the beam path leading through the light guiding region to a workpiece as light target location. In particular, the useful light is not cladding light and not leakage light.

According to some embodiments, provision is made for the optical fiber to includes a cladding region extending around the light guiding region in a circumferential direction. The light guiding region is in particular a fiber cladding or part of a fiber cladding. Such a cladding region may advantageously increase the efficiency of the light guiding within the optical fiber. Particularly depending on the modes of the laser light coupled into the optical fiber, it is possible for cladding light to occur in the cladding region. What is important is that irrespective of whether cladding light occurs in the cladding region, in accordance with the teaching proposed here what is used for assessing the input coupling quality is not the cladding light, but rather a portion, that is to say the reflection, of the useful light propagating through the light guiding region.

According to some embodiments, provision is made for the reflection element to be designed as an optical beam shaping element for performing beam shaping on the useful light. Such a beam shaping element may be for example a lens, in particular collimation lens or diverging lens, a diffractive optical element, a waveplate, an axicon, or a wedge. In this configuration, a back-reflection of the beam shaping element is advantageously used, meaning that the laser system is able to be designed in a more compact manner.

Alternatively, the reflection element is preferably arranged, in addition to an optical beam shaping element, in a beam path of the useful light. Such a beam shaping element may be for example a lens, in particular collimation lens or diverging lens, a diffractive optical element, a waveplate, an axicon, or a wedge. In this configuration, therefore, a back-reflection of the beam shaping element is not used, but rather a separate reflection element is provided, which is provided in particular specifically for generating the back-reflection. A beam shaping element typically includes a high-quality antireflection coating. By contrast, the reflection element preferably includes an antireflection coating of reduced quality at least on one surface, in order to be able to reflect back a larger proportion of the useful light than the beam shaping element.

According to some embodiments, provision is made for the reflection element to be designed as an element selected from a group consisting of: A plane-parallel plate and a window. If the reflection element is a plane-parallel plate or a window, it is preferably provided in addition to a beam shaping element.

According to some embodiments, provision is made for the optical fiber to be designed as a hollow core photonic crystal fiber (HC PCF). Alternatively, the optical fiber is preferably designed as a photonic band gap fiber. Alternatively, the optical fiber is preferably designed as an antiresonant fiber (antiresonant coupling fiber). In particular, the optical fiber is preferably designed as a tubular fiber. Alternatively, the optical fiber is preferably designed as an inhibited coupling fiber, in particular as a Kagomé fiber. Such fibers are suitable in particular for guiding ultrashort pulses, hence for ultrashort pulse applications such as ultrashort pulse welding, for example.

According to some embodiments, provision is made for the reflection element to be provided with a first antireflection coating having a first reflectance at a front end face with respect to the direction of propagation of the useful light. The reflection element is provided with a second antireflection coating having a second reflectance at a rear end face with respect to the direction of propagation of the useful light. The first reflectance is greater than the second reflectance. It is thus advantageously possible, on the one hand, to generate a back-reflection that is sufficiently intensive for controlling the input coupling, but at the same time, on the other hand, to prevent the reflection element from having overall an unnecessarily low transmission and thus disadvantageously attenuating the useful light. In other words, in one advantageous configuration, a trade-off between generating a meaningful back-reflection, on the one hand, and a transmission of the useful light with the least possible attenuation, on the other hand, is achieved, in particular. According to one preferred configuration, the reflectance at the front end face is increased in particular in comparison with antireflection coatings typically used, in order to generate a defined back-reflection that is usable for a meaningful measurement of the input coupling quality. At the rear end face, by contrast, the reflection element preferably has a reflectance that is customary for antireflection coatings, with the result that advantageously power losses are minimized, in particular unnecessary power losses are avoided. The first reflectance is preferably from at least 0.1% to at most 2%, preferably from at least 0.3% to at most 2%, preferably from at least 0.1% to at most 1%, preferably from at least 0.5% to at most 1%, preferably from at least 0.1% to at most 0.5%. The second reflectance is preferably at most 0.2%, preferably at most 0.1%.

According to some embodiments, provision is made for the measuring device to includes a light measuring device that is configured to capture a light power and/or a mode profile of the captured reflection of the useful light.

The light measuring device is preferably designed as a camera. This allows an accurate measurement of the position of the reflection in the image plane of the camera.

Alternatively, the light measuring device is preferably designed as a photodiode. In this way, the position of the reflection and thus the input coupling quality may be assessed very accurately-if appropriate in particular more cost-effectively than with a camera.

According to some embodiments, provision is made for the measuring device to includes a control device, wherein the coupling device includes a controllable aligning device configured to align the input coupling of the useful light into the optical fiber unit. The control device is operatively connected to the aligning device and is configured to control the aligning device depending on the captured reflection of the useful light. In this way, in particular an automatic or automated, preferably also permanent, alignment of the input coupling, with the alignment proceeding in particular in real time, and thus in particular readjustment of the input coupling quality are advantageously possible. In one preferred configuration, the aligning device includes two motorized mirror holders, which are able to be controlled by way of the control device in such a way that the input coupling of the useful light into the optical fiber unit is optimized. Alternatively or additionally, it is preferably possible for the aligning device to includes an alignable, that is to say in particular adjustable, input coupling lens.

The laser system preferably includes a measurement reflection element arranged upstream of the first fiber end surface in the direction of propagation, configured to guide light guided back through the light guiding region away from the beam path of the useful light, in particular in the direction of the measuring device. This may in particular be the reflection from the reflection element. Alternatively or additionally, however, it is also possible for the light guided back through the light guiding region and guided away from the beam path by the measurement reflection element to be process light that makes it possible to assess the work process performed using the useful light. "Guiding away" is understood to mean in particular—particularly in the case of a partly transparent deflection element and depending on the undisturbed beam path of the useful light—"transmitting" or "deflecting".

The measurement reflection element may be integrated into the input coupling end of the optical fiber unit, for example into an end cap or a plug of the optical fiber. It may however also be a separate element that is provided in addition to the optical fiber unit and in particular separately therefrom.

If the measurement reflection element is used additionally or alternatively to guiding away the reflection coming from the reflection element in order to realize process monitoring of the work process performed using the useful light, a ratio of irradiated light power to returning light power may in particular serve as a measure of the reaction from the process. The measurement reflection element is then advantageously configured to guide process light guided back through the light guiding region in the direction of the measuring device.

In one preferred configuration, the measurement reflection element is additionally configured to guide a further portion of the useful light incident in the direction of propagation away from the beam path on the input coupling side in the direction of an additional light measuring device. It is thus possible also to assess the irradiated power for the purpose of the process monitoring and in particular to form a ratio of irradiated power to returning power as a measure of a reaction from the process. The additional light measuring device is preferably part of the measuring device, which is accordingly additionally configured to assess the work process. A comparison between the measured values of the light measuring device, on the one hand, and of the additional light measuring device, on the other hand, may in particular, additionally or alternatively to the process monitoring, also be used to monitor optical fiber breakage.

It is however also possible for an additional optical deflection element, in particular a beam splitter, to be used instead of the measurement reflection element, in order that the further portion of the useful light incident in the direction of propagation is guided away on the input coupling side in the direction of the additional light measuring device, or an aligning mirror is designed in partly transparent fashion for this purpose.

The partly transparent aligning mirror may additionally or alternatively also be used to transmit the reflection coming from the reflection element to the light measuring device.

According to some embodiments, provision is made for the measuring device to additionally be configured to capture the further portion of the useful light, said further portion being guided away from the beam path before the input coupling into the optical fiber unit. The measuring device is furthermore configured to assess a processing process performed using the useful light with the laser system on the basis of the captured reflection of the useful light or captured process light and the captured further portion of the useful light. It is thereby possible in particular to perform process monitoring, wherein a ratio of irradiated power to returning power is preferably considered as a measure of the reaction from the process. Furthermore, a rapid shutdown may preferably be performed if returning light is expected but none is able to be detected. Optical fiber breakage monitoring may in particular be realized in this way.

The measurement reflection element, the additional optical deflection element or a partly transparent aligning mirror is in particular preferably used in order to capture the further portion of the useful light, said further portion being guided away from the beam path before the input coupling into the optical fiber unit. If the measurement reflection element is used for this purpose, in one advantageous configuration, this advantageously at the same time serves to guide the reflection of the useful light or the process light onto the measuring device.

Embodiments of the present invention also provide a method for assessing an input coupling quality of the input coupling of useful light from a laser radiation source into an optical fiber unit, wherein a laser system according to embodiments of the invention or a laser system according to one of the exemplary embodiments described above is used in the context of the method. In particular, the advantages that have already been explained in connection with the laser system are realized in connection with the method.

In the context of the method, in particular, a reflection of the useful light as deflected by the reflection element of the optical fiber unit is captured, wherein the input coupling quality is assessed on the basis of the captured reflection of the useful light.

In the process, a light power and/or a mode profile of the captured reflection of the useful light is preferably captured.

Preferably, the input coupling of the useful light into the optical fiber unit is automatically aligned on the basis of the captured reflection of the useful light.

Preferably, the emission of the useful light is prevented if an intensity of the captured reflection of the useful light falls below a predetermined threshold value.

Preferably, a further portion of the useful light is captured, said further portion being guided away from the beam path of the useful light before the input coupling into the optical fiber unit. In this case, a processing process performed using the useful light with the laser system is preferably assessed on the basis of the captured reflection of the useful light or captured process light and on the basis of the captured further portion of the useful light.

FIG. 1 shows a schematic illustration of a first exemplary embodiment of a laser system 1, which includes a laser radiation source 3 for emitting useful light and also one exemplary embodiment of an optical fiber unit 5. The laser radiation source 3 is designed in particular as a laser, preferably as an ultrashort pulse laser. The laser system 1 additionally includes a coupling device 7 for coupling the useful light into the optical fiber unit 5. The laser system 1 further includes a measuring device 9 configured to capture a reflection of the useful light as deflected by a reflection element 11 of the optical fiber unit 5. The measuring device 9 is preferably configured to assess an input coupling quality of the input coupling of the useful light into the optical fiber unit 5 on the basis of the captured reflection of the useful light.

The optical fiber unit 5 includes an optical fiber 13 comprising a light guiding region 15 configured for guiding useful light through the optical fiber 13 and, at a first fiber end 17, which is an input coupling end 21, a first fiber end surface 25 for coupling laser light into the light guiding region 15 and, at a second fiber end 19, which is an output coupling end 23, a second fiber end surface 27 for coupling laser light out of the light guiding region 15.

The reflection element 11 is arranged downstream of the second fiber end surface 27, in particular downstream of the output coupling end 23, in the direction of propagation of the useful light and is configured to deflect the reflection of the useful light from the direction of propagation and to couple it, counter to the direction of propagation, back into the light guiding region 15 via the second fiber end surface 27. The measuring device 9 is arranged upstream of the first fiber end surface 25, in particular upstream of the input coupling end 21, in the direction of propagation of the useful light. The reflection of the useful light as deflected by the reflection element 11 and guided back through the light guiding region 15 is able to be captured by the measuring device 9 and advantageously used to assess the input coupling quality. In this case, in particular, a very stable and reproducible assessment of the input coupling quality is possible, wherein the beam quality is also captured, in particular, wherein the formation of a power plateau is avoided, in particular.

In one preferred configuration, the optical fiber 13 includes a cladding region 33 extending around the light guiding region 15 in a circumferential direction, said cladding region merely being indicated schematically here.

The laser system 1, preferably the optical fiber unit 5, additionally includes an optical beam shaping element 35, here in the form of a lens, in particular a diverging lens. The optical beam shaping element 35 is provided for performing beam shaping on the useful light, in particular for coupling the latter out of the light guiding region 15 and for spreading the useful light. In the case of this first exemplary embodiment of the optical fiber unit 5, the reflection element 11 is designed as the beam shaping element 35 or is formed by the beam shaping element 35. It is in particular designed as a lens, in particular a diverging lens. There is then no need for a separate reflection element 11, with the result that this configuration is particularly compact. The beam shaping element 35 may alternatively also be designed as a diffractive optical element, as a waveplate, as an axicon, or as a wedge.

The optical fiber 13 is preferably designed as a hollow core photonic crystal fiber, as a photonic band gap fiber, as an antiresonant fiber, in particular a tubular fiber, or as an inhibited coupling fiber, in particular a Kagomé fiber.

The reflection element 11 is preferably provided with a first antireflection coating having a first reflectance at a front end face 39 with respect to the direction of propagation of the useful light. The reflection element is provided with a second antireflection coating having a second reflectance at a rear end face 41 with respect to the direction of propagation of the useful light, The first reflectance is greater than the second reflectance. Preferably, the reflectance at the front end face 39 is increased in particular in comparison with antireflection coatings typically used, in order to generate a defined back-reflection that is usable for a meaningful measurement of the input coupling quality. At the rear end face 41, by contrast, the reflection element 11 preferably has a reflectance that is customary for antireflection coatings, with the result that advantageously power losses are minimized, in particular unnecessary power losses are avoided. The first reflectance is preferably from at least 0.1% to at most 2%, preferably from at least 0.3% to at most 2%, preferably from at least 0.1% to at most 1%, preferably from at least 0.5% to at most 1%, preferably from at least 0.1% to at most 0.5%. The second reflectance is preferably at most 0.2%, preferably at most 0.1%.

The measuring device 9 preferably includes a light measuring device 43 configured to capture a light power and/or a mode profile of the captured reflection of the useful light. In one preferred configuration, the light measuring device 43 is designed as a camera or as a photodiode.

In addition, the measuring device 9 preferably includes a control device 45. The coupling device 7 preferably includes a controllable aligning device 47 for aligning the input coupling of the useful light into the optical fiber unit 5. The control device 45 is operatively connected to the aligning device 47 and is configured to control the aligning device 47 depending on the captured reflection of the useful light. In one preferred configuration, the aligning device 47 includes two motorized mirror holders 49, which are able to be controlled by the control device 45 for an automatic alignment of the input coupling. Alternatively, an input coupling lens 50 may also be designed to be settable, in particular alignable, and controllable by the control device 45 for an automatic alignment of the input coupling.

The measuring device 9 further includes a measurement reflection element 51 in order to guide the reflection of the useful light as guided back through the light guiding region 15 by the reflection element 11 away from a beam path of the useful light, preferably at a specific angle, in particular in the direction of the measuring device 43. The measurement reflection element 51 is formed particularly compactly here by a partly transparent aligning mirror held in the second mirror holder 49. However, it may also be provided separately from and in addition to the latter.

The measurement reflection element 51 may additionally be used to capture a measure of the input-coupled power by way of an additional light measuring device for process monitoring purposes. The process monitoring is explained in greater detail in association with FIG. 2.

Figure 2:
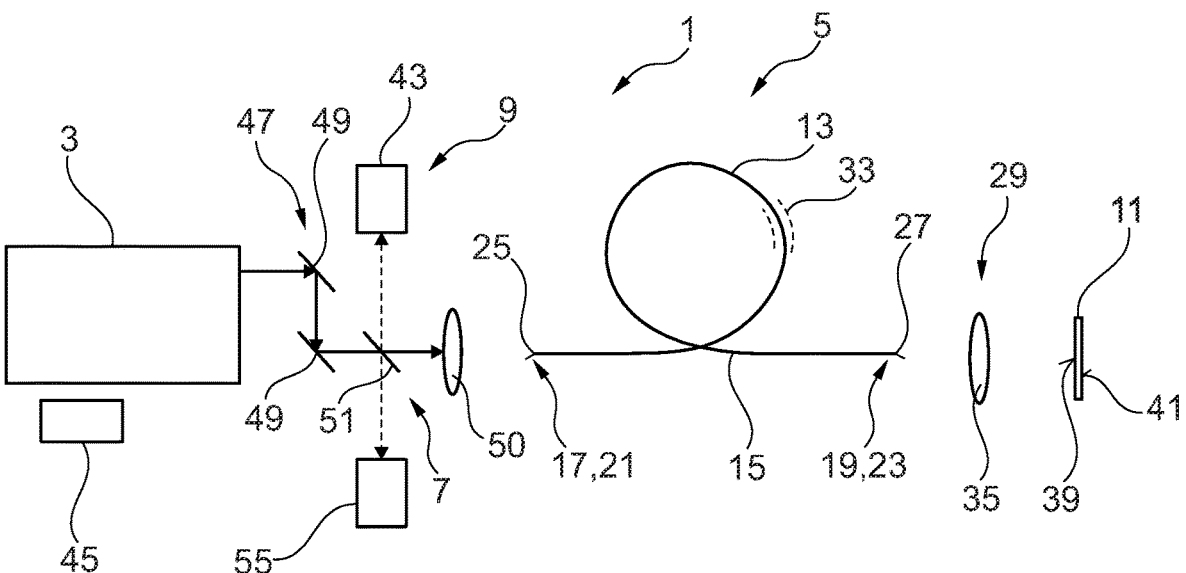
FIG. 2 shows a schematic illustration of a second exemplary embodiment of a laser system.

FIG. 2 shows a schematic illustration of a second exemplary embodiment of the laser system 1 with a second exemplary embodiment of the optical fiber unit 5. Elements that are the same or functionally the same are provided with the same reference signs in all of the figures, and so to this extent reference is respectively made to the foregoing description.

In the second exemplary embodiment of the laser system 1, the reflection element 11 is provided in addition to the optical beam shaping element 35, which is designed here as a collimation lens, and separately therefrom. The reflection element 11 here is preferably designed as a plane-parallel plate. Alternatively, it is possible for the reflection element 11 to be designed as a window.

The measurement reflection element 51, provided separately from the mirror holder 49 here, is preferably additionally also used to deflect a portion of the useful light incident in the direction of propagation on the input coupling side in the direction of the additional light measuring device 55.

The measurement reflection element 51 may in particular be used to perform process monitoring by virtue of process light being captured by the light measuring device 43. At the same time, a measure of the input-coupled power may be captured by way of the additional light measuring device 55, wherein a comparison between the captured process light power and the input-coupled power may be used to assess the work process. The additional light measuring device 55 is preferably part of the measuring device 9, wherein the measuring device 9 is additionally configured to assess the work process accordingly. Accordingly, a comparison between the measured values of the light measuring device 43, on the one hand, and of the additional light measuring device 55, on the other hand, may also be used to monitor optical fiber breakage.

The measurement reflection element 51 may in particular be designed as a measuring mirror, wherein suitable coating of a front side and a rear side of the measurement reflection element 51 ensures that the useful light is able to pass through the measuring mirror with almost no reduction in the direction of propagation, but the back-reflection is directed with sufficient intensity onto the light measuring device 43. In particular, preferably, 99% of the useful light is transmitted in the direction of propagation, and a proportion of 1% of the back-reflection is reflected onto the light measuring device 43. In one alternative configuration, the measurement reflection element 51 may also be designed as a thin-film polarizer, wherein a ½ plate (not illustrated here) rotates the polarization of the back-reflection on the return path.

As part of a method for assessing the input coupling quality of the input coupling of the useful light from the laser radiation source 3 into the optical fiber unit 5, a laser system 1 in accordance with one of the exemplary embodiments described above is preferably used, wherein the emission of the useful light is preferably prevented if an intensity of the captured reflection of the useful light falls below a predetermined threshold value. This in particular makes it possible to achieve monitoring of optical fiber breakage.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A laser system comprising:

a laser radiation source for emitting light, an optical fiber unit that comprises an optical fiber, wherein the optical fiber comprises a light guiding region configured for guiding the light through the optical fiber, an input coupling end having a first fiber end surface for coupling the light into the light guiding region, and an output coupling end having a second fiber end surface for coupling the light out of the light guiding region, a coupling device for coupling the light emitted by the laser radiation source into the optical fiber unit, a reflection element that is arranged downstream of the second fiber end surface in a direction of propagation of the light and is configured to reflect the light coupled out of the light guiding region back toward the second fiber end surface to be coupled back into the light guiding region via the second fiber end surface, and a measuring device that is arranged upstream of the first fiber end surface in the direction of propagation and is configured to capture the light reflected by the reflection element, wherein the reflection element is provided with a first antireflection coating having a first reflectance at a front end face with respect to the direction of propagation of the light, and is provided with a second antireflection coating having a second reflectance at a rear end face with respect to the direction of propagation of the light, and wherein the first reflectance is greater than the second reflectance.

2. The laser system as claimed in claim 1, wherein the optical fiber comprises a cladding region extending around the light guiding region in a circumferential direction.

3. The laser system as claimed in claim 1, wherein the reflection element is configured as an optical beam shaping element for performing beam shaping on the light.

4. The laser system as claimed in claim 3, wherein the reflection element is arranged in a beam path of the light.

5. The laser system as claimed in claim 1, wherein the reflection element is configured as a plane-parallel plate or a window.

6. The laser system as claimed in claim 1, wherein the optical fiber is configured as a hollow core photonic crystal fiber, as a photonic band gap fiber, as an antiresonant fiber, or as an inhibited coupling fiber.

7. The laser system as claimed in claim 1, wherein the optical fiber is configured as a tubular fiber or as a Kagomé fiber.

8. The laser system as claimed in claim 1, wherein the measuring device is configured to assess an input coupling quality of an input coupling of the light into the optical fiber unit based on the captured light reflected by the reflection element.

9. The laser system as claimed in claim 1, wherein the measuring device comprises a light measuring device configured to capture a light power and/or a mode profile of the captured light.

10. The laser system as claimed in claim 9, wherein the light measuring device comprises a camera or a photodiode.

11. The laser system as claimed in claim 1, wherein the measuring device comprises a control device, wherein the coupling device comprises a controllable aligning device for aligning an input coupling of the light into the optical fiber unit, wherein the control device is operatively connected to the aligning device and is configured to control the aligning device based on the captured light.

12. The laser system as claimed in claim 1, wherein the measuring device is further configured to capture a further portion of the light, the further portion being guided away from a beam path of the light before being coupled into the optical fiber unit, wherein the measuring device is further configured to assess a processing process performed using the light with the laser system based on the captured light reflected by the reflection element, or the captured light reflected by the reflection element and the captured further portion of the light.

13. A method for assessing an input coupling quality of input coupling of light emitted from a laser radiation source into an optical fiber unit, wherein a laser system as claimed in claim 1 is used, and wherein emission of the light by the laser radiation source is prevented if an intensity of the captured light reflected from the reflection element falls below a predetermined threshold value.

* * * * *